(No Model.) 7 Sheets—Sheet 3.
W. A. PECK & R. A. BRIGHT.
CIGAR BUNCHING MACHINE.
No. 451,739. Patented May 5, 1891.
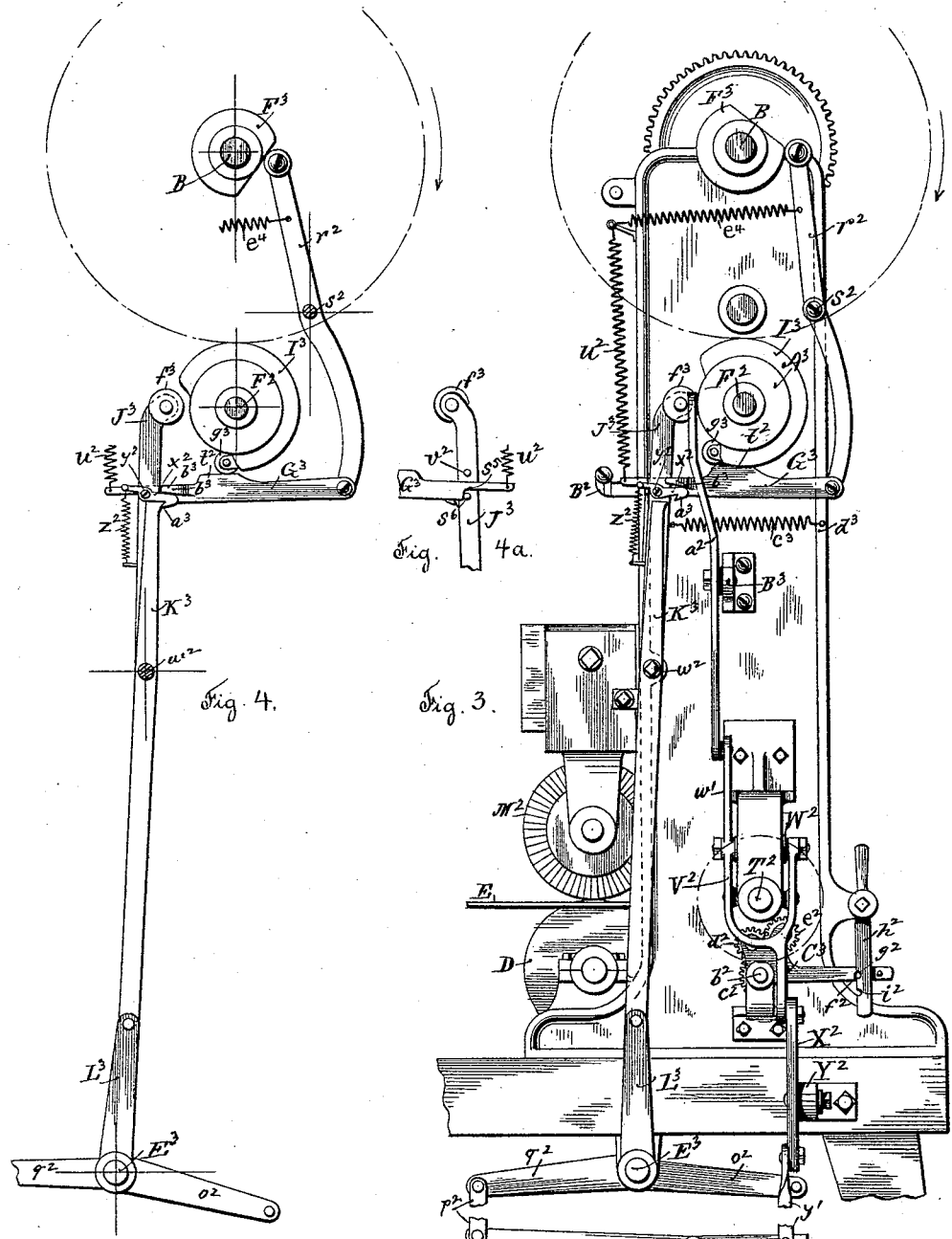

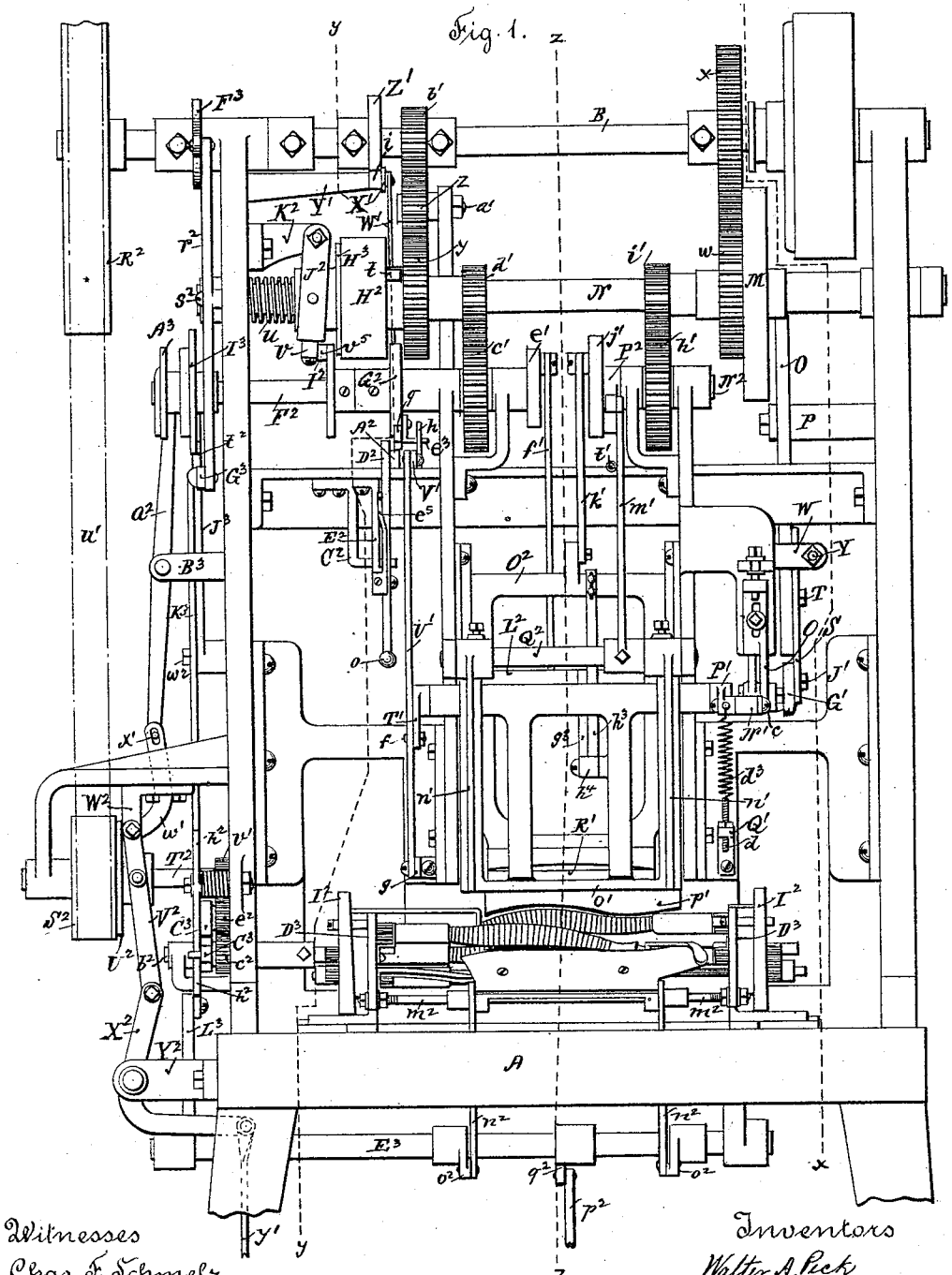

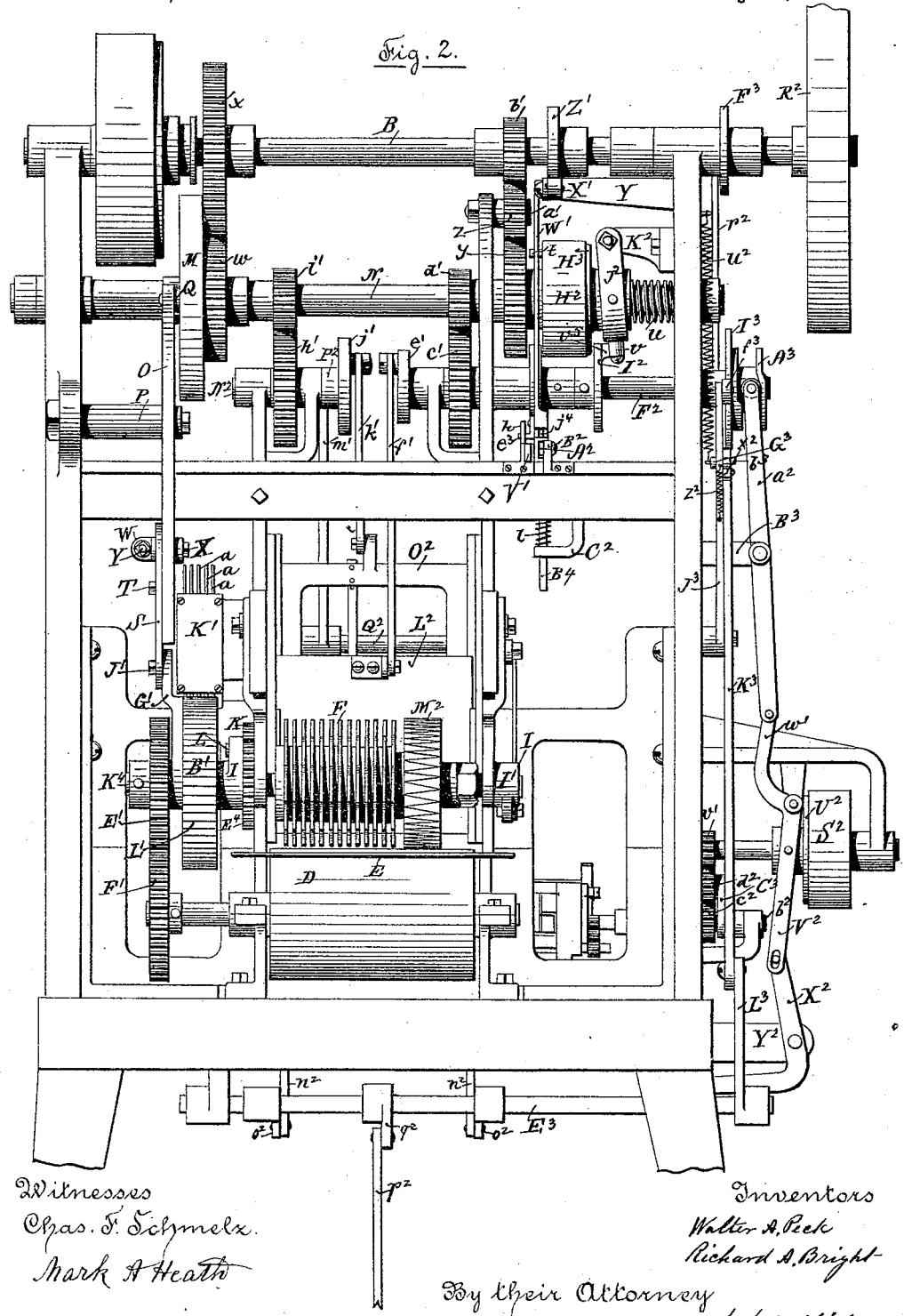

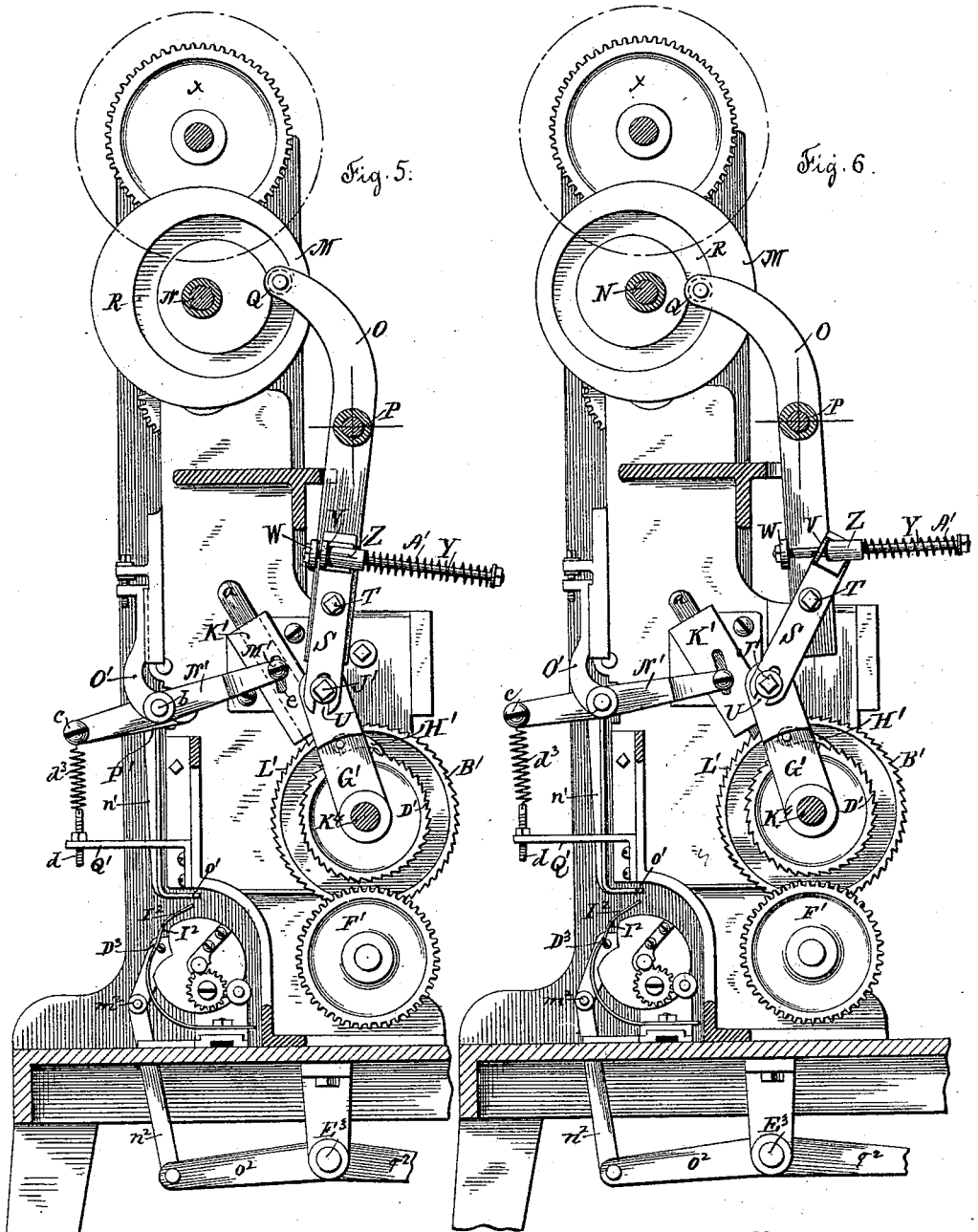

(No Model.) 7 Sheets—Sheet 5.
W. A. PECK & R. A. BRIGHT.
CIGAR BUNCHING MACHINE.
No. 451,739. Patented May 5, 1891.
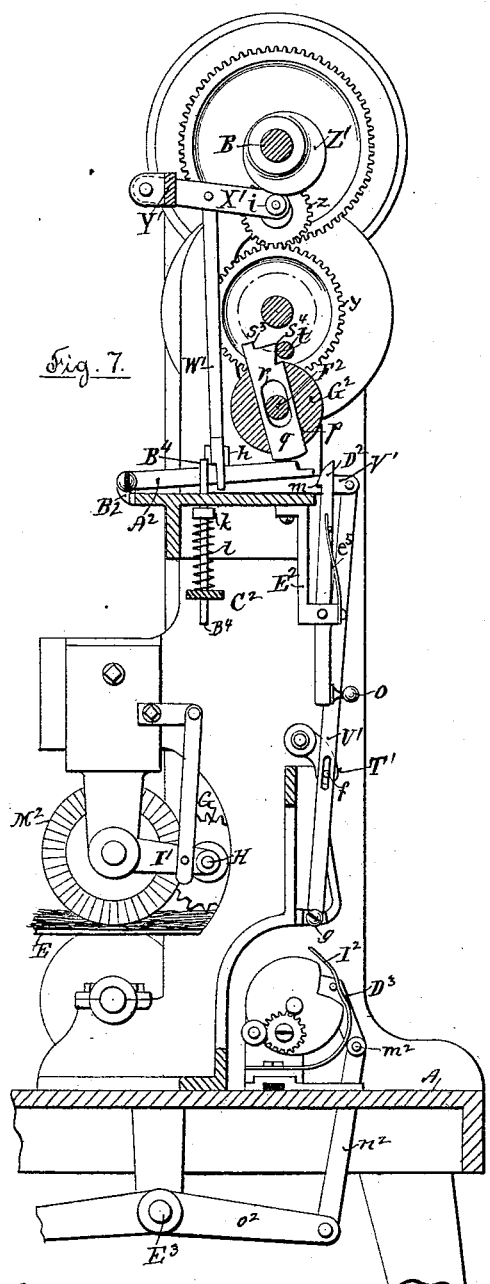
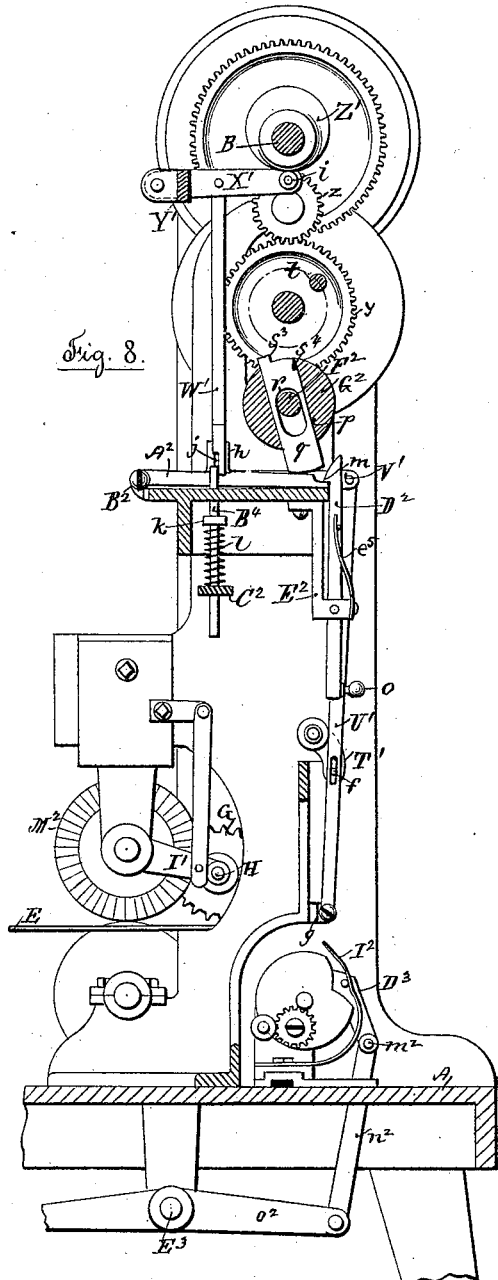
Witnesses
Chas. F. Schmelz.
Mark A. Heath
Inventors
Walter A. Peck
Richard A. Bright
By their Attorney
S. Scholfield

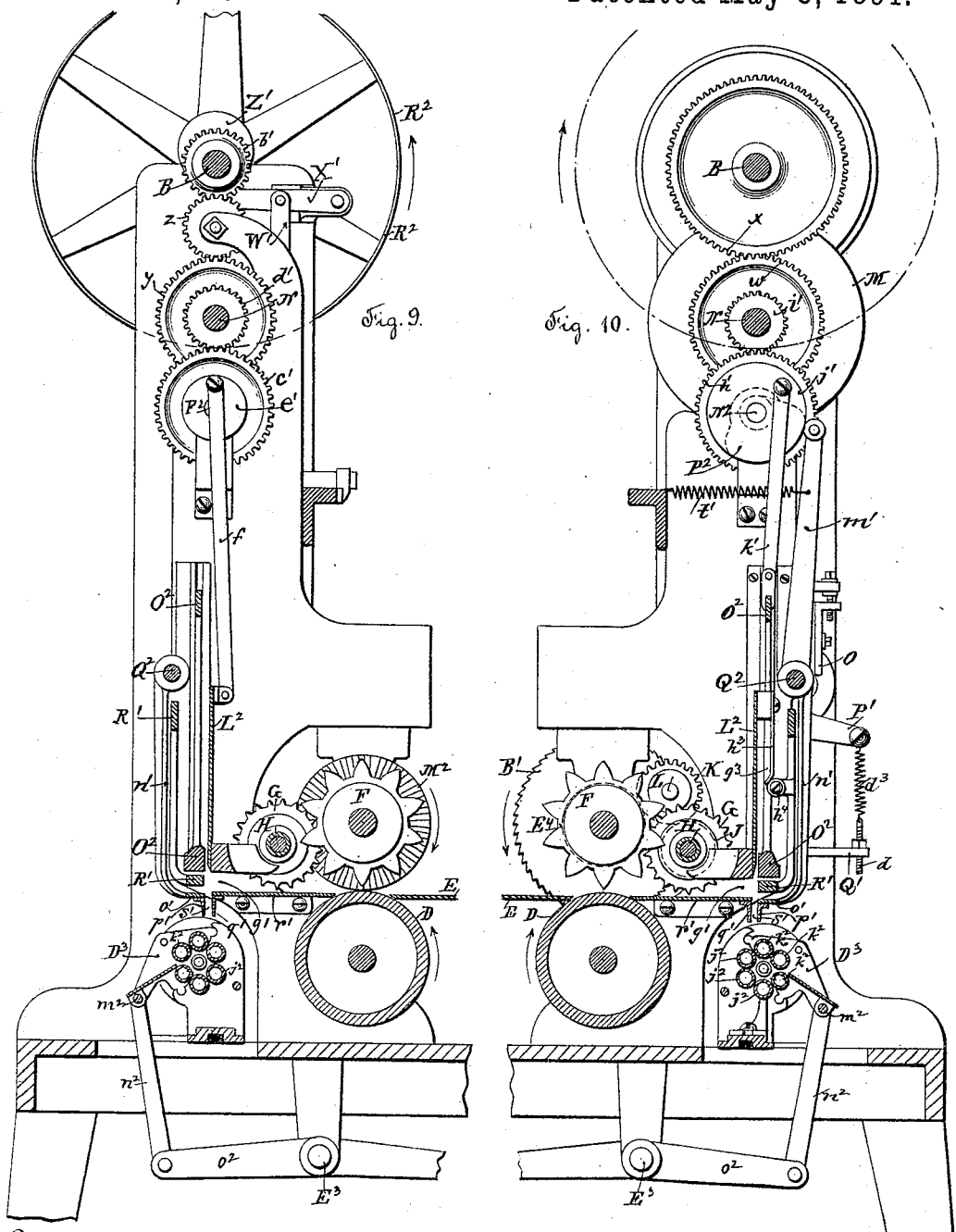

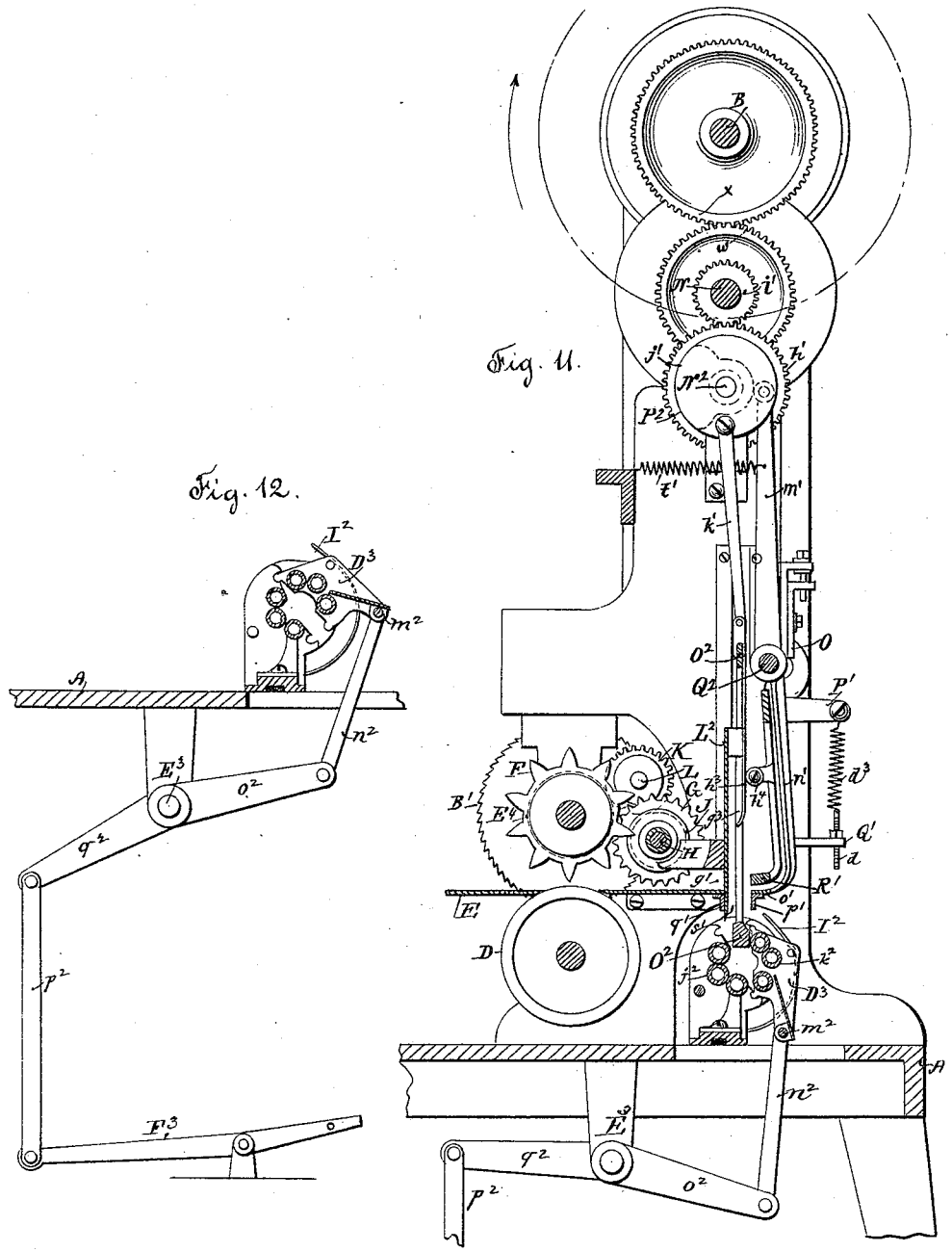

UNITED STATES PATENT OFFICE.

WALTER A. PECK AND RICHARD A. BRIGHT, OF PROVIDENCE, RHODE ISLAND; SAID BRIGHT ASSIGNOR TO SAID PECK.

CIGAR-BUNCHING MACHINE.

SPECIFICATION forming part of Letters Patent No. 451,739, dated May 5, 1891.

Application filed April 22, 1890. Serial No. 349,001. (No model.)

*To all whom it may concern:*

Be it known that we, WALTER A. PECK and RICHARD A. BRIGHT, citizens of the United States, residing at Providence, in the State of Rhode Island, have invented a new and useful Improvement in Cigar-Bunch Machines, of which the following is a specification.

In cigar-bunch machines as heretofore constructed the mechanism for feeding the proper quantity of fillers into the measuring-chamber, so that the same will be measured under a uniform yielding pressure, has only been arranged in the machine to operate independently of the mechanisms for cutting off the properly-measured quantity of fillers and discharging the same into a suitable holding-receptacle or into a filler-binding mechanism; and it is the object of our invention to so combine the feeding mechanism with the cutting-off and discharging mechanism and a receiving or binding mechanism that either one or all of said mechanisms may be operated automatically by the movement of the yielding presser of the filler-measuring mechanism due to the reception of the proper quantity of fillers in the measuring-chamber.

Our invention consists in the combination, with the yielding presser which forms a part of the measuring-chamber, of mechanism for automatically stopping the feed and causing the knife or knife and discharging mechanism to be thrown into operation upon the completion of the proper filling of the said chamber by the action of the feeding mechanism; and it also consists in the combination, with the yielding presser, of means for automatically operating a filler receiving or binding mechanism in timely relation to the movement of the yielding presser and the resulting automatic operation of the knife and the filler-discharging mechanism.

It also consists in improved means for stopping the movement of the feeding mechanism upon the proper filling of the measuring-chamber, and also in the improved combination and arrangement of mechanical devices for the proper performance of the several operations of the machine, as hereinafter fully set forth.

Figure 1 represents a front elevation of the machine. Fig. 2 represents a rear elevation of the same. Fig. 3 represents a side elevation. Fig. 4 represents a detail view showing a changed position of the tripping-levers from the position represented in Fig. 3. Fig. 4ª is a detail view serving to illustrate the operation of the tripping movement. Figs. 5 and 6 represent a vertical section taken in the line $x\ x$ of Fig. 1, showing different positions of the operating-cam and the connecting-levers of the feeding mechanism. Figs. 7 and 8 represent a vertical section taken in the line $y\ y$ of Fig. 1, showing different positions of the engaging mechanism which forms a portion of the connection between the yielding presser, the knife, and the discharging mechanism and the binding mechanism. Figs. 9 and 10 represent reverse views taken from a vertical section in the line $z\ z$ in Fig. 1. Fig. 11 represents a vertical section, the same as in Fig. 10, but showing the knife and the discharging-plunger in their extreme downward position for discharging the fillers into the rolling-pocket of the binding mechanism. Fig. 12 represents the treadle and the connecting-levers for opening the rolling-pocket of the binding mechanism to discharge the completely-bound bunch.

In the accompanying drawings, A represents the frame of the machine, and B the main driving-shaft. The fillers to form the bunch are placed upon the fixed apron E, and are cut in tapering form by means of the rotary zigzag cutter $M^2$, attached to the shaft of the spur-roller F, and are forced into the sizing-chamber by means of the roller D, the spur-roller F, which is connected with the roller D by means of the gears E' and F', and the spur-roller G, which is held to revolve upon a bearing-rod H, the said rod being rigidly connected to the outer ends of the arms I I', and the said spur-roller G is driven from the gear $E^4$ of the spur-roller F by means of the gear J upon the spur-roller G and the intermediate gear K, held upon a stud L, which is attached to the arm I, as shown in Figs. 2 and 10. The roller D and the spur-rollers F and G (see Figs. 2, 5, and 6) are driven from the cam M, which is loose upon the shaft N, by means of the lever O, the said lever being held upon a fixed stud P, provided at its upper end with a roller Q, which is held in the eccentric-groove R of the cam M, and to the lower end of the lever O is pivoted the lever S by means of the screw-stud T, the lower end of the lever S being provided with the slot U, and the upper end of the same with the vertically-slotted knee V. Upon the lower arm of the lever O is attached the bracket W by means of the screw X, and to the projecting end of the said bracket is attached the elongated stud Y, upon which is arranged a sliding sleeve Z and the spiral spring A', the said stud Y passing through the slot in the knee V.

To the shaft $K^4$ of the spur-roll F is attached the ratchet-wheel B', provided interiorly with the reversely-directed ratchet-teeth D', and upon the shaft $K^4$ is pivoted the ratchet-arm G', to the inner side of which is pivoted the ratchet-catch H', the said catch being adapted to engage with the ratchet-teeth D' of the wheel B', and to the upper end of the ratchet-arm G' is attached the screw-stud J', which enters the slot U at the lower end of the lever S.

In a slide-box K', attached to the frame of the machine, is placed a series of sliding pawls $a\ a\ a$, the engaging-points of which are arranged in steps, one in advance of the other, in order to make proper engagement with the exterior ratchet-teeth L' of the ratchet-wheel to prevent backlash in the movement of the said wheel. The pawls $a\ a\ a$ are provided with a transverse slot, (not shown in the drawings,) through which is inserted the screw-pin M', which is held at the forked end of the lever N' and passes through opposite slots $e$ in the sides of the box K', said lever being pivoted at the point $b$ to the adjustable bracket O', attached to the frame of the machine, and the outer end of the lever N' is provided with a screw-stud $c$, which is loosely held in an enlarged perforation in the outer end of the arm P', and to the outer end of the arm P' is attached the spring $d^3$ and adjusting-screw $d$, which is held in the bracket Q'. The arm P' is attached to the pivot-stem of the swinging yielding presser R', which forms the outer wall of the sizing-chamber, and to the opposite pivot-stem of the presser R' is attached the downwardly-extending arm T', which at its end is provided with a stud $f$, adapted to enter a suitable perforation in the lever U', the said lever being pivoted at its lower end to the bracket $g$ and jointed at its upper end to the sliding bar V', to which is attached the upright slotted guide $h$, the slot $j$ of which is adapted to receive a guiding arm or pin $e^3$, extending from the pendent engaging-bar W', the said bar being pivoted at its upper end to the lever X', the said lever being pivoted to the bracket Y', attached to the frame, and provided at its outer end with a roller $i$, which engages with the periphery of the eccentric-cam Z' upon the driving-shaft B. The lower end of the bar W' is provided with a slot $j^4$, which is adapted to receive the lever $A^2$, which is pivoted to the bracket $B^2$, attached to the frame, the lower end of the said bar W' being guided in its up-and-down movement with the movement of the lever X' by means of the lever $A^2$ and the movable slotted guide $h$. The lever $A^2$ is held in the slotted upper end of the vertically-sliding bar $B^4$, which passes through a perforation in the frame of the machine and also through a perforation made in the outer end of the bracket-arm $C^2$, and upon the sliding bar $B^4$ is placed the collar $k$, and upon the bar $B^4$, between the collar $k$ and the bracket-arm $C^2$, is placed the compressed spiral spring $l$, which tends to throw the bar $B^4$ and the lever $A^2$ upward. The outer end of the lever $A^2$ is adapted to engage with the catch projection $m$ of the latch $D^2$, the said latch being pivoted to the bracket $E^2$ and held in an outward position by means of a spring $e^5$ and provided at its lower end with a knob or handle $o$.

To the shaft $F^2$ is attached the disk $G^2$, which is provided upon its face with a groove $p$, adapted to receive the sliding bar or key $q$, the said bar being provided with a slot $r$ to receive the shaft $F^2$, one end of the said sliding bar being provided with the notches $s^3$ and $s^4$, adapted for engagement with the pin $t$ at the side of the friction-clutch member $H^2$, which is loose upon the shaft N, the opposite engaging clutch member $H^3$ being loosely splined to the shaft and caused to slide thereon into engagement with the loose clutch member $H^2$ by means of the spiral spring $u$, which encircles the shaft N, and the said clutch member $H^3$ is drawn out of engagement with the loose member $H^2$ by means of the cam $I^2$ upon the shaft $F^2$, which cam engages with the roller $v$ upon the shipper-lever $J^2$, the said lever being pivoted to the bracket $K^2$, attached to the frame.

The loose cam M, which serves to operate the feeding mechanism, is driven from the shaft B by means of the gear $w$, attached to the side of the cam M, and the gear $x$, attached to the shaft B, and the loose clutch member $H^2$ upon the shaft N is driven from the shaft B by means of the gear $y$, attached to the side of the clutch member $H^2$, the intermediate gear $z$, which revolves loosely upon the stud $a'$, and the gear $b'$, attached to the shaft B, the said gear $y$ being made twice the diameter of the gear $b'$, in order that the shaft N shall make twice the number of revolutions of the shaft B' and the shaft $F^2$ is driven from the shaft N by means of the gear $c'$, attached to the shaft $F^2$, and the gear $d'$, attached to the shaft N, the said gear $c'$ being made twice the diameter of the gear $d'$, in order that the shaft $F^2$ shall revolve twice as fast as the shaft N, and upon the inner end of the shaft $F^2$ is attached the crank $e'$, from which a connecting-rod $f'$ extends to the vertically-sliding knife or gate $L^2$, which serves to divide the quantity of fillers in the sizing-chamber from the incoming mass of fillers in the throat $g'$. The shaft $N^2$ is supported in line with the axis of the shaft $F^2$, and is driven from the shaft N by means of the gear $h'$, attached to the shaft $N^2$, and the gear $i'$, attached to the shaft N, the gear $h'$ being made twice the diameter of the gear $i'$, so that the shafts $N^2$ and $F^2$ will be revolved in unison with each other.

To the inner end of the shaft $N^2$ is attached the crank $j'$, from which connection is made to the vertically-sliding plunger $O^2$ by means of the connecting-rod $k'$, and to the shaft $N^2$ is also attached the cam $P^2$, which operates upon the arm $m'$, attached to the rock-shaft $Q^2$, the said arm being held against the said cam by means of the spring $t'$, and to the said rock-shaft $Q^2$ are attached the arms $n'$, which are connected at their lower ends by means of the bar $o'$, the said bar serving to form the floor of the filler measuring or sizing chamber, and to the bar $o'$ is attached the downwardly-extending plate $p'$, which, with a similar plate $q'$, attached to the throat bed-plate $r'$, serves to form a discharging throat or passage $s'$, through which the properly-measured fillers are discharged into a suitable receptacle or into the rolling-pocket of the binding mechism.

At the outer end of the shaft B is attached the pulley $R^2$, from which connection is made to the loose pulley and friction-clutch member $S^2$ upon the shaft $T^2$ by means of the belt $u'$, and to the inner end of the shaft $T^2$ is attached the gear $v'$, which serves to rotate the binding mechanism. The sliding clutch member $U^2$ is splined to the shaft $T^2$, and is operated for engagement and disengagement by means of the lever $V^2$, which is pivoted to the bracket $W^2$, the said lever being provided with an upwardly-extending arm $w'$, having a slot $x'$, and the lower end of the lever $V^2$ is jointed to the upper end of the bell-crank lever $X^2$, which is pivoted to the bracket $Y^2$, and from the lower end of the lever $X^2$ connection is made with a treadle $Z^2$ by means of the connecting-rod $y'$, the said treadle $Z^2$ being pivoted to the stand $z'$, as shown in Fig. 3. From the forked upper end of the lever $V^2$ connection is made to the cam $A^3$ upon the outer end of the shaft $F^2$ by means of the lever $a^2$, which is pivoted to the bracket $B^3$, attached to the frame of the machine.

To the driving-shaft $b^2$ of the binding mechanism is attached the gear $c^2$, and upon suitable studs at the inner side of the lever $C^3$, which is pivoted to the shaft $b^2$, are placed the gears $d^2$ $e^2$, which engage with the teeth of the gear $c^2$, the said gears $d^2$ and $e^2$ being so arranged relatively to the gear $v'$ that upon raising the outer end of the said lever, so that the pin $f^2$ will come into engagement with the notch $g^2$ of the hand-latch $h^2$, the gear $e^2$ will be thrown into engagement with the driving-gear $v'$, and when the outer end of the said lever is carried downward until the pin $f^2$ will enter the notch $i^2$ of the hand-latch $h^2$ the gear $d^2$ will be in engagement with the driving-gear $v'$, thus reversing the movement of the driving-shaft $b^2$ of the binding mechanism.

The binding-rolls $j^2$ (shown in Fig. 10) are held for rotation in a fixed position, while the corresponding opposite rolls $k^2$ are made movable for the purpose of opening to receive the measured fillers and for discharging the finished bunch, the said movable rolls $k^2$ being held in position with the rolls $j^2$ by means of the attaching-heads $D^3$ $D^3$ and the curved springs $l^3$ $l^3$, and the said rolls can be opened and closed by means of a treadle $F^3$, from which connection is made to the cross-bar $m^2$, which connects the heads $D^3$ $D^3$ by means of the rods $n^2$ $n^2$, which connect with the arms $o^2$ $o^2$, attached to the rock-shaft $E^3$, and the connecting-rod $p^2$, which extends from the treadle to the arm $q^2$, attached to the said shaft.

In order to provide for the automatic opening and closing of the binding-rolls in timely relation to the discharging movement of the knife $L^2$ and plunger $O^2$, we arrange a cam $F^3$ upon the driving-shaft B, which engages with a lever $r^2$, pivoted to the frame A at the stud $s^2$, and is held against the said cam by means of the spring $e^4$, and to the lower end of the lever $r^2$ is jointed the swinging bar $G^3$, which is provided with a raised face $t^2$, adapted to engage with the roller $g^3$ and the raised periphery of the cam $I^3$, which is attached to the shaft $F^2$, and the said swinging bar $G^3$ is held against the periphery of the cam $I^3$ by means of the spring $u^2$, and the upward movement of the outer end of the bar $G^3$ is limited by means of a pin $v^2$, inserted into the side of the arm $J^3$, the said arm being pivoted to the stud $w^2$ and provided at its outer side with the catch $x^2$, which is pivoted to the arm $J^3$ by means of the screw-stud $y^2$ and held in an upward position, as shown in Fig. 3, by means of the spiral spring $z^2$, the hook end $a^3$ of the catch $x^2$ being held by the spring $z^2$ against the under side of the projection $b^3$, which extends laterally from the side of the bar $G^3$, the said arm $J^3$ being carried toward the cam $I^3$ by means of the spiral spring $c^3$, which connects the said arm with the rib $d^3$ of the frame, and the upper end of the arm $J^3$ is provided with a roller $f^3$, adapted to engage with the periphery of the cam $I^3$. The arm $J^3$ is also adapted to be carried back from the cam $I^3$ by the engagement of the shoulder $s^5$ at the lower side of the swinging bar $G^3$ with the pin $s^6$ at the side of the arm $J^3$.

Upon the pivot-stud $w^2$ of the arm $J^3$ is also placed the lever $K^3$, the upper end of which is adapted for engagement with the catch $x^2$, the lower end of the lever $K^3$ being jointed to the arm $L^3$, which extends upward from the rock-shaft $E^3$, whereby upon the proper movement of the lever $K^3$ the rolls of the binding mechanism will be opened to receive the fillers from the sizing-chamber.

Upon the back of the knife $L^2$ is attached the wedge-formed piece $g^3$, and to the plunger $O^2$ is attached a similar wedge-formed piece $h^3$, the said wedge-formed pieces being adapted to cause the backward movement of the presser R' and the swinging floor $o'$ of the sizing-chamber.

Instead of extending the roller D entirely under the spur-roller F, the fixed apron E may be extended under the said spur-roller, as is common in cigar bunch machines, the portion of the roller D which is shown as extending under the said spur-roller being either reduced in diameter or removed.

The operation of the machine will be as follows: The fillers to form the bunch are first placed upon the fixed apron E and forced forward by hand or otherwise to the spur-roller F and the zigzag cutter $M^2$, the said cutter being arranged to press against the surface of the rotary cutting-bed D, and operates to taper the ends of the ingoing fillers to form the properly-tapered cigar-bunches, and the tapered fillers, after passing between the rotary cutting-bed D and the spur-roller F and cutter $M^2$, will be forced into the sizing-chamber by means of the spur-roller G. The yielding presser R', which is held to a forward position within the sizing-chamber by means of the adjustable tension-spring $d^3$, will be gradually forced back by the incoming fillers against the resilient action of the spring until the pawls $a\ a\ a$ are brought into engagement with the external teeth of the ratchet-wheel B', thus effectually stopping the further feeding of the fillers into the sizing-chamber, the movement thereafter imparted to the lever O by the cam M being taken up by the spring-joint between the levers O and S, so that the ratchet-catch H' will not thereafter be operated by the said cam, and when the yielding presser R' has been forced to its backward position by the entrance of the proper quantity of tobacco into the sizing-chamber the upper end of the lever U' will be thrown outward, thus moving the sliding bar V' and the connected engaging-bar W', which is pivoted to the cam-operated lever X', to a position in which the said bar W' will be carried out of engagement with the upper end of the spring-operated sliding bar $B^4$, so that the engaging-bar W' will thereafter cease to prevent the engagement of the outer end of the lever $A^2$ with the lower end of the sliding key $q$, thus allowing the spring $l$ to throw the sliding key $q$ to the position shown in Fig. 7, in which the pin $t$ at the side of the loose clutch member $H^2$ will be brought into engagement with the notch $s^4$ of the key, thus causing the partial rotation of the shaft $F^2$, which partial rotation will serve to carry the projection $v^5$ of the cam $I^2$ out of engagement with the roller $v$ of the shipper-lever $J^2$, thus allowing the spring $u$ to slide the clutch member $H^3$ into engagement with the loose revolving clutch member $H^2$ to cause the continuance of the revolution of the shaft $F^2$, which revolution will first cause the downward movement of the knife or gate $L^2$ to cut off the quantity of fillers in the sizing-chamber, and then cause the elevation of the knife preparatory to the entrance of a fresh quantity of fillers into the sizing-chamber, and when the shaft $F^2$ has made nearly a complete revolution the projection $v^5$ of the cam $I^2$ will, by engagement with the roller $v$ of the shipper-lever $J^2$, separate the clutch members $H^2$ and $H^3$, leaving the sliding key $q$ in such a position in its revolution that the pin $t$ of the clutch member $H^2$ will strike into the notch $s^3$, thus slightly rotating the shaft $F^2$ and causing the sliding key to be set in proper position for renewed operation upon the entrance of the proper quantity of fillers into the sizing-chamber, as before. When the shaft $F^2$, which operates the knife, makes a revolution, the shaft $N^2$, which is geared therewith, will also make a revolution, thus causing first a slight upward movement and then a downward movement of the plunger $O^2$, which plunger serves to carry the tobacco in the sizing-chamber downward into the rolling-pocket of the binding mechanism, and also the upward movement of the plunger to its former position. Upon the downward movement of the knife and plunger the floor $o$ of the sizing-chamber will be carried back out of the way of the plunger by the action of the cam $P^2$ upon the shaft $N^2$, and upon the initial movement of the shaft $F^2$, in its revolution to cut off and discharge the fillers from the sizing-chamber, the action of the cam $A^3$ at the outer end of the shaft $F^2$ upon the upper end of the lever $a^2$ will be such as to cause the sliding of the clutch member $U^2$ upon the shaft $T^2$ out of engagement with the loosely-rotating clutch member $S^2$, thus stopping the rotary movement of the rolls of the binding mechanism while the measured fillers from the sizing-chamber are being deposited within the rolling-pocket, the subsequent action of the cam $A^3$ serving to again engage the clutch members, and thus cause the proper rolling of the inclosed fillers in the binding-pocket, and upon the initial rotary movement of the shaft $F^2$ the roller $g^3$ upon the cam $I^3$ will engage with the raised face $t^2$ of the swinging bar $G^3$, thus causing the depression of the catch $x^2$ upon the arm $J^3$ into engagement with the upper end of the lever $K^3$, the shoulder $s^5$ at the same time engaging with the pin $s^6$ at the side of the arm $J^3$ to force the catch $x^2$ and upper end of the lever $K^3$ outward by the action of the cam $F^3$, which is located upon the driving-shaft B, and thus, through the lever-arm $L^3$, causing the opening movement of the rolls $k^2$ of the binding mechanism. Upon the release of the raised face $t^2$ from engagement with the roller $g^3$ the roller $f^3$ at the upper end of the arm $J^3$ will be in engagement with the raised portion of the cam $I^3$, and thus prevent the closing movement of the rolls, through the action of the springs $I^2\ I^2$, until the roller $f^3$ is released from the raised portion of the cam, and then the rolls $k^2$ of the binding mechanism will be closed by the action of the said springs.

Whenever it is desired to so adjust the yielding presser that the horizontal area of the sizing-chamber shall not equal the area of the face of the plunger, then the action of the wedge-formed piece $g^3$ at the back of the knife upon the roller $g^4$ of the yielding presser will cause the proper backward movement of the presser upon the initial downward movement of the knife, and the wedge-formed piece $h^3$, which is attached to the plunger and acts upon the roller $h^4$ to move the yielding presser to a still farther backward position, serves to prevent the contact of the side of the plunger with the face of the yielding presser.

Whenever for any cause—as, for instance, to give time to run on two binders upon the inclosed fillers—it is desirable to interfere with the automatic action of the knife and plunger and the automatic opening-and-closing movement of the binding mechanism, the projecting catch $m$ of the latch $D^2$ is to be carried forward, so as to engage with the outer end of the lever $A^2$, as shown in Fig. 8, and thus prevent the said lever from acting upon the sliding key $q$ until released by the operator.

We claim as our invention—

1. The combination, with a yielding presser and a knife, of mechanism operatively connected with said presser for automatically causing the knife to be thrown into operation upon the completion of the measurement of the fillers, substantially as described.

2. The combination, with a yielding presser and a discharging-plunger, of mechanism operatively connected with said presser for automatically causing the discharging-plunger to be thrown into operation upon the completion of the measurement of the fillers, substantially as described.

3. The combination, with a yielding presser, a knife, and a discharging-plunger, of mechanism operatively connected with said presser for automatically causing the knife and discharging-plunger to be thrown into operation upon the completion of the measurement of the fillers, substantially as described.

4. The combination, with a yielding presser, a knife, a discharging-plunger, and feed mechanism, of mechanism operatively connected with said presser for automatically stopping the feed and causing the knife and discharging-plunger to be thrown into operation, substantially as described.

5. The combination, with a yielding presser, a knife, a discharging-plunger, and binding mechanism, of mechanism operatively connected with said presser for automatically opening and closing the receiving-pocket of the binding mechanism and causing the knife and discharging-plunger to be thrown into operation to discharge the measured fillers into said receiving-pocket, substantially as described.

6. The combination, with a yielding presser and a binding mechanism, of mechanism operatively connected with said presser for automatically opening and closing the receiving-pocket of the binding mechanism and stopping and starting the rotation of the rolls of said binding mechanism, substantially as described.

7. The combination, with a yielding presser and feeding mechanism, of a yielding ratchet device for operating said feeding mechanism, and mechanism operatively connected with said yielding presser for directly and positively stopping the feed, substantially as described.

8. The combination, with feeding mechanism provided with a ratchet-wheel, of an engaging ratchet-catch, a yielding jointed arm for operating said ratchet-catch, said jointed arm being normally held in a rigid condition, and a pawl for stopping the feeding mechanism, whereby upon the engagement of said pawl the jointed arm will yield, so as not to operate the ratchet-catch, substantially as described.

9. The combination, with a yielding presser, a knife, a discharging-plunger, and means operatively connected with said presser for automatically causing the operation of the knife and plunger, one or both, of a hand-operated device whereby the automatic operation of the knife and plunger may be prevented until such time as desired, and then allowed to operate by releasing said hand device, substantially as described.

10. The combination, with a yielding presser, a knife, and a discharging-plunger, of a cam-operated engaging device controlled in its action by the yielding presser, a pivoted arm, a spring tending to throw the said arm upward, a rotary sliding key, and mechanism operated by said sliding key to cause the operation of the knife and plunger upon the proper filling of the measuring-chamber, substantially as described.

11. The combination, with a yielding presser, a knife, and a discharging-plunger, of a cam-operated engaging device controlled in its action by the yielding presser, a pivoted arm, a spring tending to throw said arm upward, a rotary sliding key, a clutch member held loosely upon a shaft and adapted to engage with the sliding key, an opposite clutch member splined to the shaft, a spring for throwing said last-mentioned clutch member into engagement, and a cam for throwing said clutch member out of engagement, the said cam being subsequently moved out of the way by means of the sliding key, so as to allow the spring to act, whereby the knife and plunger will be operated, substantially as described.

12. The combination, with a yielding presser and a binding mechanism, of a cam-operated engaging device controlled in its action by the yielding presser, a pivoted arm, a spring tending to throw said arm upward, a rotary sliding key, a clutch member held loosely upon a shaft and adapted to engage with the sliding key, an opposite clutch member splined to the shaft, a spring for throwing said last-mentioned clutch member into engagement, and a cam for throwing said clutch member out of engagement, the said cam being subsequently moved out of the way by means of the sliding key, so as to allow the spring to act, whereby the receiving-pocket of the binding mechanism will be opened and closed, substantially as described.

13. The combination, with a yielding presser and a binding mechanism, of a cam-operated engaging device controlled in its action by the yielding presser, a pivoted arm, a spring tending to throw said arm upward, a rotary sliding key, a clutch member splined to the shaft, a spring for throwing said clutch member into engagement, a cam for throwing said clutch member out of engagement, the said cam being subsequently moved out of the way by means of the sliding key, so as to allow the spring to act, a clutch member upon the shaft for driving the rolls of the binding mechanism, and a cam for moving the said clutch into and out of engagement, substantially as described.

14. The combination, with a measuring-chamber having a movable bottom and means for holding the said bottom member in position to receive the filler until the knife has severed the filler in the chamber from the mass, of means for automatically moving said bottom member and allowing the filler to be discharged and a plunger operating to discharge the filler, substantially as described.

15. The combination, with a yielding presser and a knife, of a cam-shaped wedge connected to said knife for operating said yielding presser, so that if the required quantity of fillers to be measured in the measuring-chamber is not sufficient to move the yielding presser out of the path of the plunger it will be so moved by said wedge, substantially as described.

16. The combination, with a yielding presser, a knife, and a plunger, of a cam-shaped wedge connected to the knife for operating the yielding presser, so that if the required quantity of fillers to be measured in the chamber is not sufficient to move the yielding presser out of the path of the plunger it will be so moved by said wedge, and a similar wedge on the plunger for holding the yielding presser back during the movement of the plunger past the presser, substantially as described.

17. A measuring-chamber having three side walls, each disconnected from the other and movable one with relation to the other, one of said walls constituting a yielding presser, substantially as described.

18. A measuring-chamber one side of which is formed by the plunger, another side by the yielding presser, and another side made movable to permit the discharge of the measured fillers from the chamber, substantially as described.

19. A measuring-chamber one side of which is formed by the plunger, another side by the yielding presser, and another side made movable to permit the discharge of the measured fillers, in combination with mechanism operatively connected with said yielding presser for automatically moving the plunger and the movable bottom to discharge the fillers, substantially as described.

20. The combination of a rotary zigzag cutter, a rotary cutting-bed therefor, and a spur-roller for feeding the fillers forward to the measuring-chamber, substantially as described.

21. The combination of a rotary zigzag cutter, a rotary cutting-bed therefor, and a spur-roller mounted upon the same shaft with the rotary cutter, substantially as described.

WALTER A. PECK.
RICHARD A. BRIGHT.

Witnesses:
  W. H. THURSTON,
  S. SCHOLFIELD.